United States Patent [19]

Harada

[11] Patent Number: 5,029,665
[45] Date of Patent: Jul. 9, 1991

[54] AUTO-CARRYING SYSTEM
[75] Inventor: Nori Harada, Ome, Japan
[73] Assignee: Kioritz Corporation, Tokyo, Japan
[21] Appl. No.: 463,196
[22] Filed: Jan. 10, 1990
[30] Foreign Application Priority Data
  Jan. 19, 1989 [JP] Japan .................... 1-003888[U]
[51] Int. Cl.$^5$ .............................................. B60P 3/07
[52] U.S. Cl. ...................................... 180/198; 104/88;
                                        180/168; 239/173
[58] Field of Search ................. 104/88; 180/198, 168;
            414/537; 105/72.2; 239/173, 172, 210, 209

[56]         References Cited
        U.S. PATENT DOCUMENTS 2,161,818  6/1939  Joy ...................................... 180/198
  4,077,535  3/1978  Oriol .................................. 180/168

FOREIGN PATENT DOCUMENTS 44977    4/1977  Japan ................................. 180/198
  189783  12/1983  Japan .
  2022038 12/1979  United Kingdom ................ 180/198

Primary Examiner—Mitchell J. Hill
Attorney, Agent, or Firm—Browdy and Neimark

[57]           ABSTRACT

An auto-carrying system has a self-propelled vehicle and a mobile carrier capable of carrying the vehicle such that the vehicle can run onto and off the carrier. Sensor actuating poles are arranged along the path of movement of the carrier, while sensors capable of generating signals for controlling the running of the vehicle are carried by the vehicle such that they can engage with the sensor actuating poles during the movement of the carrier so as to control the running operation of the vehicle.

3 Claims, 3 Drawing Sheets

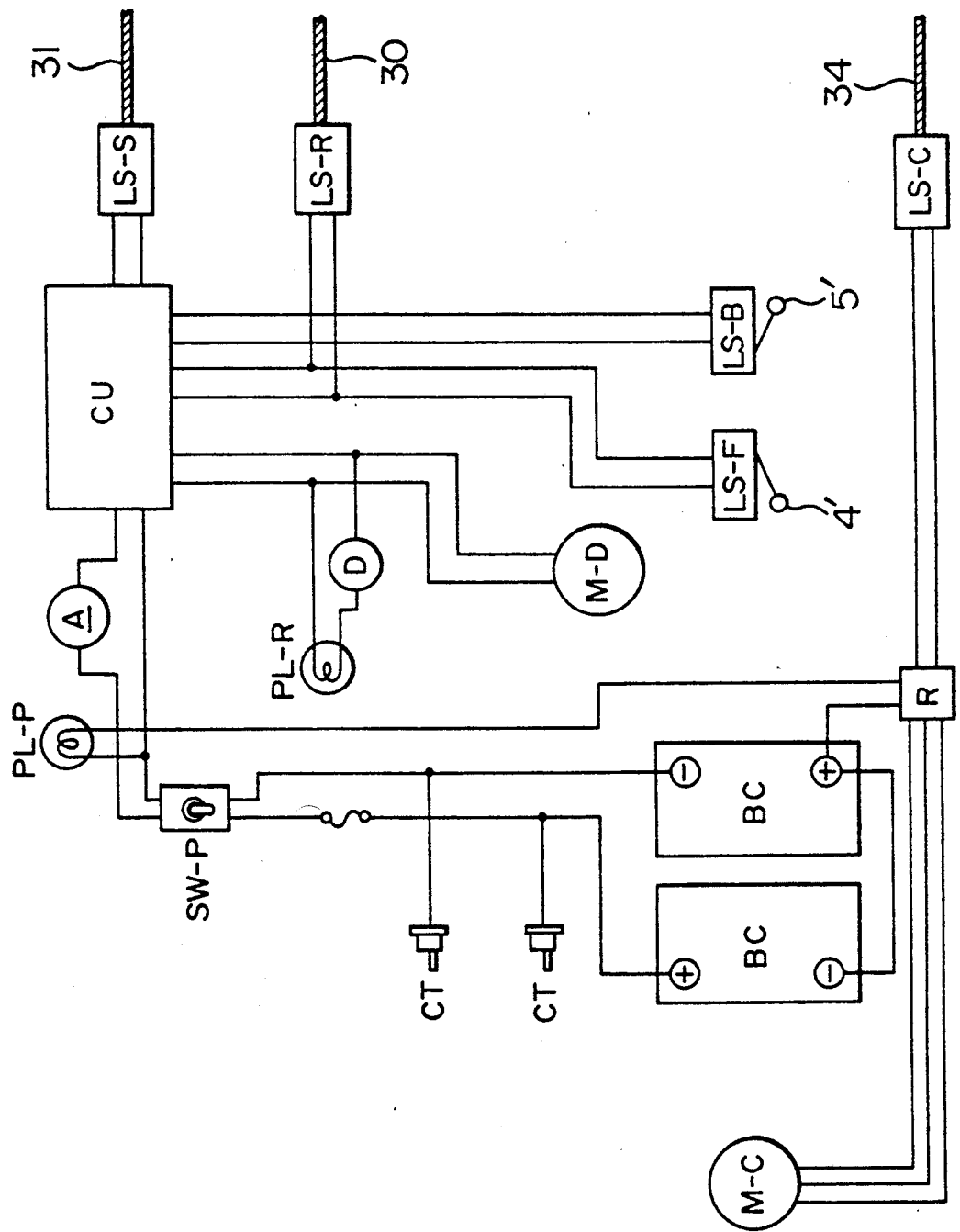

AUTO-CARRYING SYSTEM

The present invention relates to an auto-carrying system in which the direction of running of a vehicle is turned automatically and easily by means of a carrier.

Spraying of water and/or agricultural chemicals in hothouse culture of vegetables, for example, employs a self-propelled vehicle driven by an electric motor and capable of running along valleys between adjacent ridges. This type of vehicle can reciprocatingly run along a valley but cannot traverse from one to the next valley. Thus, the traversing of the vehicle to the next valley is usually conducted by manual labor.

In order to realize an automatic traversing, Japanese Utility Model Unexamined Publication No. 58-189783 discloses a system in which the vehicle is carried by an electrically-driven mobile carrier which can traverse together with the vehicle carried thereon.

This known system, however, requires quite a complicated arrangement for driving and controlling the vehicle, with the result that the system is rendered large in size and high in the cost. In addition, installation of the system required quite a laborious work. Furthermore, this known system tends to become inoperative due to failure or trouble.

SUMMARY OF THE INVENTION

Accordingly, an object of the present invention is to provide an inexpensive auto-carrying system which has a simple, light-weight and small-sized construction and which can operate with a high degree of reliability so as to make unmanned operation possible, thereby overcoming the problems of the prior art.

To this end, according to the present invention, there is provided an auto-carrying system comprising: a self-propelled vehicle; a carrier for carrying the self-propelled vehicle such that the self-propelled vehicle run onto and off the carrier; sensor means provided on the self-propelled vehicle and capable of controlling the running of the self-propelled vehicle; and sensor actuating means provided along the path of the carrier so as to be engaged with the sensor means during the movement of the carrier.

BRIEF DESCRIPTION OF THE DRAWINGS

FIG. 3 is a electric wiring diagram showing an electric circuit incorporated in the embodiment.

DESCRIPTION OF THE PREFERRED EMBODIMENT

Figure 1:
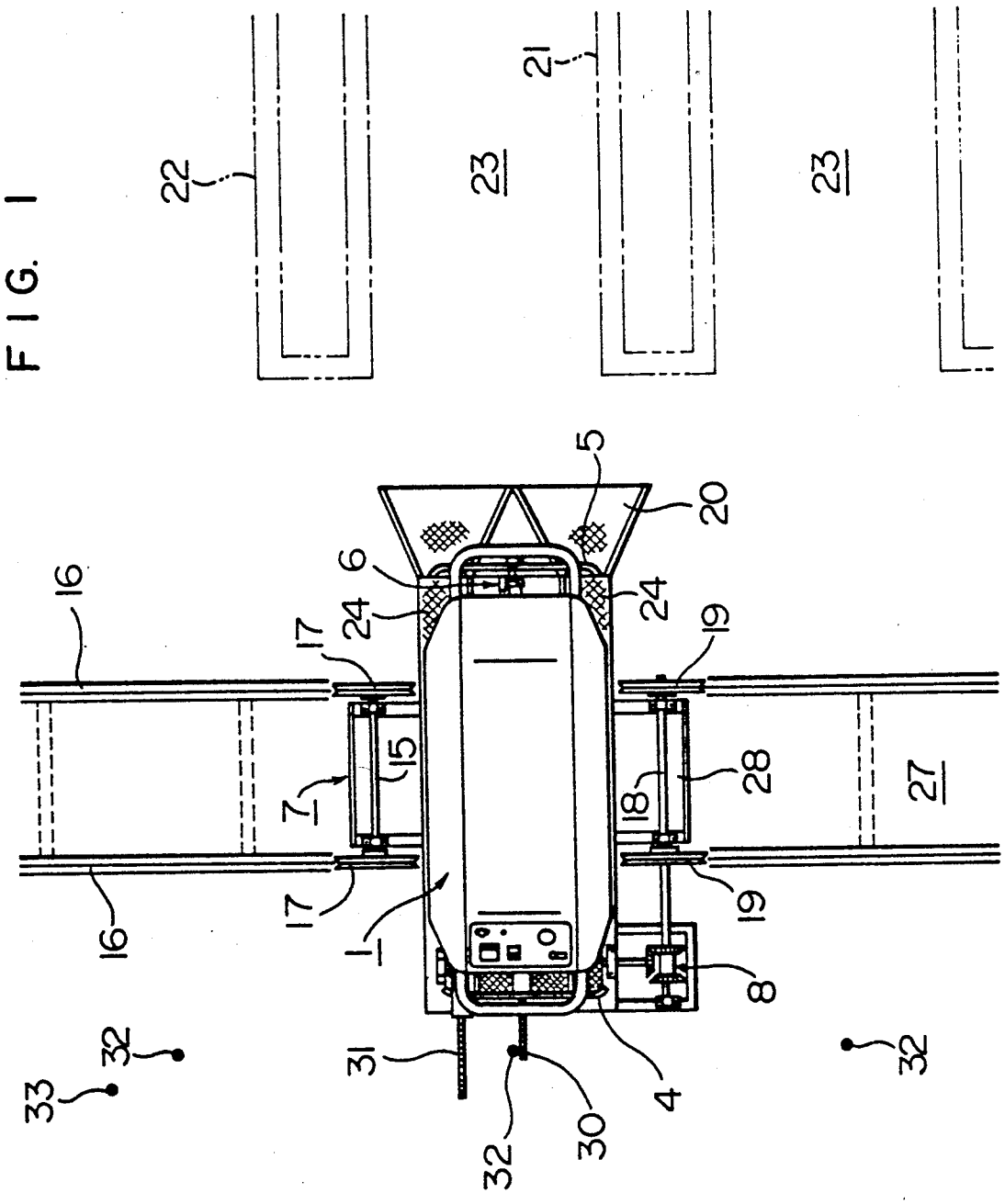
FIG. 1 is a plan view of an embodiment of the auto-carrying system in accordance with the present invention.

A preferred embodiment of the auto-carrying system of the present invention will be described hereinafter with reference to the accompanying drawings.

The accompanying drawings show an embodiment of the present invention which comprises a self-propelled vehicle 1 capable of reciprocatingly movable along a valley 23 between ridges 21 of the culture ground in a hothouse, and a mobile carrier 7 carrying the vehicle 1 and capable of traversing along rails 16, 16 formed of angle steel bars and laid at one end area 27 of the culture ground where the ridges 21, 22 are not formed.

The self-propelled vehicle 1 itself does not constitute any gist of the present invention. Briefly, the vehicle 1 has a chassis carrying a self-winding hose reel and a spray nozzle device 6, an electric motor (M-D) and a battery (BC) for driving the motor (M-D). Front wheels 2 and rear wheels 3 having rubber tires are attached to the chassis and suitably driven by the electric motor (M-D) so as to propel the vehicle 1 back and forth along the valley 23 between ridges 21, 22. (The "front" side is defined as the left-hand side as viewed in FIGS. 1 and 2).

Preferably, one-way clutches (not shown) are provided between the electric motor (M-D) and the front wheels 2 and also between the electric motor (M-D) and the rear wheels 3 so that the wheels on the leading side of the vehicle as viewed in the direction of running are power-driven so as to propel the vehicle, regardless of the direction of running. Such an arrangement ensures a smooth reciprocating running of the vehicle along the valley 23 and, therefore, is preferred.

Switch bars 4,5 for switching the direction of operation of the electric motor are projected from the front and rear ends of the self-propelled vehicle 1 for engagement with, for example, poles driven into the end area 27 of the culture ground and in the end of the valley 23 opposite to the end area 27. When the vehicle 1 runs in one and the other direction, the switch bar 4 or 5 is pressed by the pole upon contact therewith, so that a lever 4' or 5' of a forward/backward change-over limit switch LS-F or LS-B is activated to change the direction of operation of the electric motor (M-D), whereby the switching of the running direction of the vehicle 1 is automatically effected to enable the vehicle 1 to reciprocatingly move along the valley 23.

The self-propelled vehicle 1 has a reversing limit switch (LS-R) which has a resilient sensor rod 30 projected from the portion of the front end of the vehicle 1 adjacent to the switch bar 4. The sensor rod 30 ahead of the switch bar 4. When the carrier 7 carrying the self-propelled vehicle 1 traverses along the rails 16,16, the sensor rod 30 engages with one of reversing poles 32 which are arranged at the same pitch as the ridges 22. In consequence, the reversing limit switch LS-R is activated to lower the self-propelled vehicle onto the center of the next valley 23.

Figure 2:
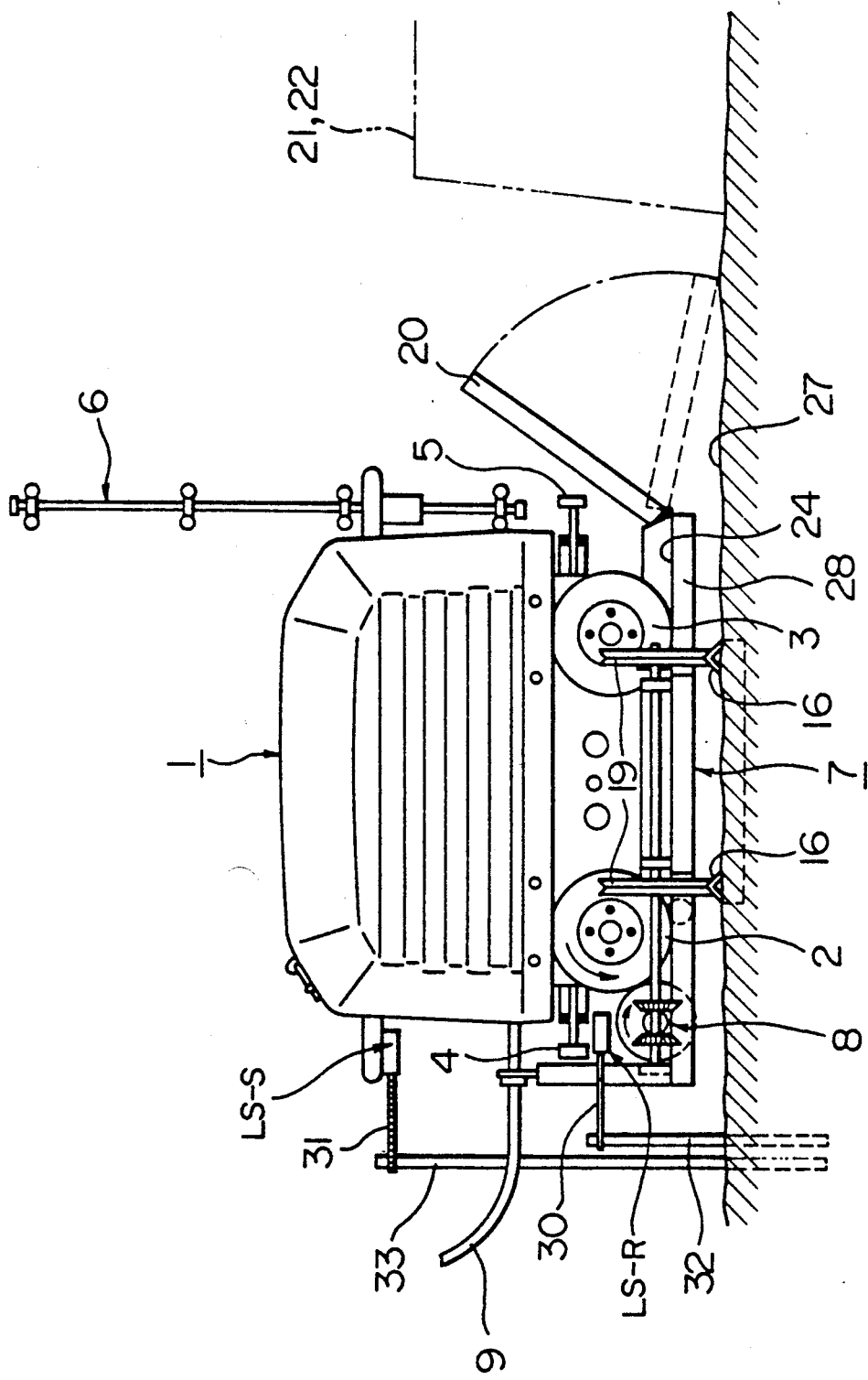
FIG. 2 is a side elevational view of the embodiment shown in FIG. 1.

In this case, therefore, the pole 32 driven into the end area 27 of the culture ground is located on the trailing side of the center of the valley 23 as viewed in the direction of movement of the carrier 7, as will be seen from FIG. 1.

The carrier 7 has a cross-shaped frame 28 composed of L-shaped angle steel bars extending in the longitudinal direction along the valley 23 and transversely along the rails 16,16. The frame 28 has front wheels 19,19 and rear wheels 17,17 provided on the front and rear portions of the frame 28 and capable of rolling on the rails 16,16, thus enabling the carrier 7 to move back and forth along the rails 16,16. (The "front" side is defined in this case as the lower side as viewed in FIG. 1.)

Tread plates 24,24 are mounted on the frame 28 so as to extend rearwardly from the mid portion of the frame as viewed in the direction of running of the self-propelled vehicle 1. The tread plates 24,24 are arranged in conformity with the tread of the rubber-tire wheels 2,3 of the vehicle 1. A slope plate 20 is provided on the rear end of the frame as viewed in the direction of movement of the vehicle 1, so as to enable the vehicle 1 to easily run onto and off the carrier 7. The slope plate 20 is hinged to the frame 28 and can be swung upward by a suitable means as illustrated after the vehicle 1 has run onto the carrier 7.

The carrier 7 is provided with a carrier driving device 8 which includes, for example, friction rollers adapted to be contacted by the front lower portions of the front rubber-tire wheels 2,2 of the vehicle 1 when the vehicle has moved onto the carrier 7. The carrier driving device 8 is powered by the forward rotation of the rubber tire wheels 2,2 of the vehicle 1 when these tires 2,2 have been brought into frictional contact therewith.

Thus, the self-driven vehicle 1 which has moved along the valley 23 runs onto the carrier 7. The forward movement of the vehicle 1 is stopped when the rubber-tire front wheels 2,2 have contacted the friction rollers of the carrier 7. The rubber-tire front wheels 2,2, however, continue to rotate so that the driving power is transmitted through the carrier driving device 8 to the front wheels 19,19 and the rear wheels 17,17 of the carrier 7, whereby the carrier 7 traverses along the rails 16,16 together with the self-propelled vehicle 1 carried thereon.

The self-propelled vehicle 1 also has a stopping limit switch LS-S positioned at a level above the level of the reversing limit switch LS-R and having a resilient sensor rod 31 projects forwardly of the vehicle 1. On the other hand, a stopping pole 33 is driven into the ground at a position where it would never be contacted by the resilient sensor rod 30 of the reversing limit switch LS-R. When the carrier 7 traverses along the rails 16,16, the self-propelled vehicle 1 also is moved transversely so that the resilient sensor rod 31 of the stopping limit switch LS-contacts the pole 33. In consequence, the electrical power supply in the self-propelled vehicle 1 is turned off so that the carrier is stopped at a predetermined position.

The auto-carrying system of the present invention can be used, for example, in spraying an agricultural chemical in a hothouse for cultivating vegetables. The initial setting of the system is conducted by extracting the hose from the hose reel on the vehicle 1 and connecting the same to a supply hose 9 which is suspended from the top of the hothouse so as to be able to move transversely and which is connected to a chemical supply source installed outside the hot-house. Then, the carrier 7, carrying the self-propelled vehicle 1, is moved to, for example, to the center of the valley 23 which is shown at the lower end part of FIG. 1.

Then, the elastic sensor rod 30 of the reversing limit switch LS-R or the switch bar 4 on the front end of the self-propelled vehicle 1 is pushed by a hand, so that the electrical power is supplied to the motor (M-D) on the vehicle 1, whereby the rubber-tire rear wheels 3 are powered to drive the vehicle 1 rearward. At the same time, the slope plate 20 is swung down to bridge the tread plates 24,24 on the carrier 7 to the ground so that the self-propelled vehicle 1 automatically move onto the ground through the slope plate 20 and runs along the valley 23 rearward while spraying the agricultural chemical and unwinding the spray hose.

When the self-propelled vehicle 1 has reached the other end of the valley 23, the switch bar 5 on the rear end of the self-propelled vehicle 1 is contacted and pushed by the pole driven into the ground so that the rearward movement of the vehicle 1 is stopped and, as explained before, the rubber-tire front wheels 2,2 of the vehicle 1 are powered in pace of the rear wheels 3,3 so as to propel the vehicle 1 in the forward direction. Thus, the self-propelled vehicle 1 runs forwardly along the valley 23 while spraying the agricultural chemical and taking up the hose onto the hose reel. The self-propelled vehicle 1, upon arriving at the end area 27 of the culture ground, run onto the carrier 7 through the slope plate 20.

The forward movement of the self-propelled vehicle 1 is stopped when the front wheels 2,2 have been brought into frictional contact with the carrier driving device 8 which is composed of, for example, friction rollers. However, the front wheels 2,2 continue to rotate by the power of the electric motor (M-D) so that the power of the motor (M-D) is transmitted to the wheels 17,17, 19,19 of the carrier 7 through the carrier driving device 8, so that the carrier 7 starts to run in the transverse direction along the rails 16,16. When the carrier 7 has reached at a position near the center of the next valley 23 as illustrated, the resilient sensor rod 30 of the reversing limit switch S-R is brought into contact with the reversing pole 32 provided on the outer end of the and are 27, so that the reversing limit switch LS-R is activated to turn off the supply of electrical power in the self-propelled vehicle 1 so that the rubber-tire front wheels 2,2 of the self-propelled vehicle 1 are not powered any more. In this state, the front wheels 2,2 also provided a braking effect so that the carrier 7 makes a stop at a mid portion of the next ridge 23. In this state, the resilient sensor rod 30 of the reversing limit switch LS-R is positioned ahead of the reversing pole 32. Therefore, the reversing limit switch L-R is never operated even when the self-propelled vehicle 1 has run onto the carrier 7 again.

Subsequently, the rear wheels 3 of the self-propelled vehicle 1 are driven and the slope plate 20 is swung down again to put the carrier 7 at the center of the next valley 23. The self-propelled vehicle 1 then move onto the ground through the slope plate 20 so as to start to run along the valley 23 rearward.

The described operation is repeated so that the self-propelled vehicle 1 can travel along all the valley 23. After running along the last valley, the resilient rod 31 of the stopping limit switch LS-S is contacted and pushed by the stopping pole 33 provided on the ground at a predetermined work completion position, so that the electrical power supply in the self-propelled vehicle 1 is turned off again to put the carrier 7 at this position together with the self-propelled vehicle 1.

The self-propelled vehicle 1 can have a spray cock operating limit switch LS-C having a resilient sensor rod 34 and capable of operating an electrically actuated cock M-C through a relay R. Such an arrangement enables the nozzle device 6 to be operated so as to start and stop the spraying operation in relation to the running of the self-propelled vehicle 1 onto and off the carrier 7, whereby wasteful spray of the agricultural chemical onto the end area 27 of the ground where there is no ridge is avoided advantageously.

The above-described operation can be controlled by an electric circuit which has, as will be seen from the wiring diagram shown in FIG. 1, a power switch SE-P, a pilot lamp PL-P, a battery meter A, a reversing pilot lamp PL-R, diode D and battery terminals CT, CT.

What is claimed is:

1. An auto-carrying system comprising: a self-propelled vehicle; a carrier for carrying said self-propelled vehicle; slope plate means connected to said carrier for permitting said self-propelled vehicle to run on and off said carrier; sensor means provided on said self-propelled vehicle for controlling the running of said self-propelled vehicle; and sensor actuating means provided along a path of said carrier for engaging with said sensor means during the movement of said carrier.

2. An auto-carrying system according to claim 1, wherein said sensor means includes a resilient sensor rod for a reversing limit switch.

3. An auto-carrying system according to claim 2, wherein said sensor actuating means includes a reversing pole and a stopping pole engageable with said resilient sensor rod.

* * * * *